United States Patent [19]

Chen et al.

[11] Patent Number: 5,338,477
[45] Date of Patent: Aug. 16, 1994

[54] POLYETHER POLYAMINO METHYLENE PHOSPHONATES FOR HIGH PH SCALE CONTROL

[75] Inventors: Shih-Ruey T. Chen, Pittsburgh; Gary F. Matz, Carnegie, both of Pa.

[73] Assignee: Calgon Corporation, Pittsburgh, Pa.

[21] Appl. No.: 879,231

[22] Filed: May 11, 1992

Related U.S. Application Data

[63] Continuation-in-part of Ser. No. 708,527, May 31, 1991, abandoned.

[51] Int. Cl.$^5$ ............................................. C02F 5/10
[52] U.S. Cl. ................................... 252/180; 252/181; 252/80; 252/82; 210/700
[58] Field of Search .................... 252/180, 181, 80, 82; 210/699, 700; 562/10

[56] References Cited

U.S. PATENT DOCUMENTS

| | | | |
|---|---|---|---|
| 2,358,222 | 9/1944 | Fink et al. | 252/175 |
| 2,539,305 | 10/1943 | Hatch | 210/697 |
| 2,783,200 | 2/1957 | Ferris et al. | 210/728 |
| 2,917,528 | 12/1959 | Ramsey et al. | 252/101 |
| 2,964,509 | 12/1960 | Ramsey et al. | 556/19 |
| 2,980,610 | 4/1961 | Ruehrwein | 210/698 |
| 3,285,886 | 11/1966 | Gunderson et al. | 252/180 |
| 3,434,969 | 3/1969 | Ralston | 210/700 |
| 3,463,730 | 8/1969 | Booth et al. | 252/180 |
| 3,514,476 | 5/1970 | Morita | 556/25 |
| 3,518,204 | 6/1970 | Hansen et al. | 252/181 |
| 3,928,196 | 12/1975 | Persinski et al. | 252/180 |
| 3,965,027 | 6/1976 | Boffardi et al. | 252/180 |
| 3,976,589 | 8/1976 | Mitchell | 252/180 |
| 4,080,375 | 3/1978 | Quinlan | 252/180 |
| 4,330,487 | 5/1982 | Redmore et al. | 210/700 |
| 4,457,847 | 7/1984 | Lorenc et al. | 210/698 |
| 4,617,129 | 10/1986 | Lees | 210/700 |
| 4,618,448 | 10/1986 | Cha et al. | 252/180 |
| 4,640,793 | 2/1987 | Persinski et al. | 252/82 |
| 4,650,591 | 3/1987 | Boothe et al. | 210/700 |
| 4,671,888 | 6/1987 | Yorke | 252/180 |
| 4,872,996 | 10/1989 | Grierson et al. | 210/700 |
| 4,931,189 | 6/1990 | Dhawan et al. | 210/700 |
| 4,936,987 | 6/1990 | Persinski et al. | 210/699 |
| 5,019,343 | 5/1991 | Hwa et al. | 422/16 |
| 5,069,798 | 12/1991 | Hwa et al. | 210/700 |
| 5,087,376 | 2/1992 | Bendiksen et al. | 210/700 |
| 5,124,046 | 6/1992 | Sherwood et al. | 210/699 |

FOREIGN PATENT DOCUMENTS 384779 2/1990 European Pat. Off. .

OTHER PUBLICATIONS

Wayplex, Hunt Chemical Corp. (Date Unknown).
Briquest 221-50A Technical Bulletin, Albright & Wilson Americas Inc. (Date Unknown).

*Primary Examiner*—Prince Willis, Jr.
*Assistant Examiner*—J. Silbermann
*Attorney, Agent, or Firm*—Craig G. Cochenour; William C. Mitchell; Michael J. Kline

[57] ABSTRACT

Polyether polyamino methylene phosphonates possess high calcium tolerance and have been found to give excellent inhibition of the formation, deposition and adherence of scale-forming salts, especially calcium carbonate, under severe conditions which include elevated pH, high dissolved solids content, and high saturation levels of calcium carbonate.

8 Claims, No Drawings

POLYETHER POLYAMINO METHYLENE PHOSPHONATES FOR HIGH PH SCALE CONTROL

REFERENCE TO RELATED APPLICATIONS

This application is a continuation-in-part of application Ser. No. 708,527, filed May 31, 1991 (Attorney Docket No. C-1527), now abandoned.

BACKGROUND OF THE INVENTION

1. Field of the Invention

The present invention relates to compositions and methods for inhibiting the formation, deposition and adherence of alkaline earth metal scale deposits, especially calcium carbonate ($CaCO_3$) scale deposits, on metallic surfaces of aqueous systems, especially under conditions of high pH and high calcite concentrations, e.g., those found in cycled up cooling towers, where those compositions comprise polyether polyamino methylene phosphonates.

Generally, calcium carbonate scale deposits are incrustation coatings which accumulate on the metallic surfaces of a water-carrying system through a number of different causes.

Various industrial and commercial water-carrying systems are subject to calcium carbonate scale formation problems. Calcium carbonate scale is of particular concern in heat exchange systems employing water, such as, for example, boiler systems, and once-through and open recirculating water cooling systems. Cooling towers are especially significant, particularly where severe conditions including high pH and high calcite concentrations are encountered.

The water employed in these systems ordinarily will contain a number of dissolved salts, and the alkaline earth metal cation calcium is usually prevalent, as is the anion carbonate. The combination product of calcium cation and carbonate anion will precipitate from the water in which they are carried to form scale deposits when the concentration of the anion and cation comprising the reaction product, i.e., calcium carbonate, exceeds the solubility of the reaction product itself. Thus, when the concentrations of calcium ion and carbonate ion exceed the solubility of the calcium carbonate reaction product, a solid phase of calcium carbonate will form as a precipitate. Precipitation of the reaction product will continue until the solubility product concentrations of the constituent ions are no longer exceeded.

Numerous factors may be responsible for producing a condition of supersaturation for the reaction product calcium carbonate. Among such factors are changes in the pH of the water system, evaporation of the water phase, rate of heat transfer, amount of dissolved solids, and changes in the temperature or pressure of the system.

For cooling systems and similar heat exchange systems including cooling towers, the mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. Precipitation is also favored on the heat transfer surface because of the inverse solubility relationship of calcium carbonate. As a result, the solubility of the scale-forming calcium carbonate salt reaction product is first exceeded in this thin film, and crystallization of calcium carbonate scale results directly on the heating or heat exchange surface.

In addition to this, a common source of scale in boiler systems is the breakdown of calcium bicarbonate to form calcium carbonate, water and carbon dioxide under the influence of heat. For open recirculating cooling water systems, in which a cooling tower, spray pond, evaporative condenser, and the like serve to dissipate heat by evaporation of water, the chief factor which promotes calcium carbonate scale formation is concentration of solids dissolved in the water by repeated evaporation of portions of the water phase. Thus, even a water which is not scale forming on a once-through basis usually will become scale forming when concentrated two, four, or six times. Moreover, alkalinity of the makeup water, with evaporative cycles over time results in an increasing alkalinity of the water in the overall system, often reaching pH's of 8.5-9.5 and even higher. Conventional scale inhibiting compositions typically fail in systems having such severe conditions.

The formation of calcium carbonate scale deposits poses a serious problem in a number of regards. The calcium carbonate scale which is formed possesses a low degree of heat conductivity. Thus, a calcium carbonate scale deposit is essentially an insulating layer imposed across the path of heat travel from whatever source to the water of the system. In the case of a cooling system, the retarded heat transfer causes a loss in cooling efficiency. In addition to this problem, calcium carbonate scale formation facilitates corrosive processes, and a substantial calcium carbonate scale deposit will interfere materially with fluid flow. Consequently, calcium carbonate scale is an expensive problem in many industrial water systems, causing delays and shutdowns for cleaning and removal.

Although the present invention is directed primarily to preventing or inhibiting the deposition of calcium carbonate scale, the most prevalent type of scale deposit, it is also applicable to inhibiting the deposition of other types of alkaline earth metal scales, especially where those are associated with calcium carbonate scale under the severe conditions described herein. For example, most industrial and commercial water contains alkaline earth metal cations, such as calcium and magnesium, etc., and several anions such as bicarbonate, carbonate, and phosphate. When combinations of these anions and cations are present in concentrations which exceed the solubility of their reaction products, precipitates form until their product solubility concentrations are no longer exceeded. These precipitates are alkaline earth metal scales. Thus, by alkaline earth metal scales is meant scales including but not limited to calcium carbonate, magnesium carbonate, and calcium phosphate. These scales form frequently in the tubes of heat exchangers and on other heat exchange surfaces, such as those in cooling towers. Particular systems or applications areas where severe conditions lead to exceptional buildup of calcium carbonate and related scales, in addition to cycled up cooling towers, include reverse osmosis systems, sugar refining evaporators, and certain types of gas scrubbers.

The polyether polyamino methylene phosphonates of the present invention are used in the same range of amounts as threshold inhibitors in the scale inhibition method of the present invention, rather than as sequestering or chelating agents, although the compositions of the present invention have dispersant properties as well and significantly reduce the adherency of any scale deposit which is formed, facilitating its easy removal.

Scale-forming compounds can be prevented from precipitating by inactivating their cations with chelating or sequestering agents, so that the solubility of their reaction products is not exceeded. Generally, this requires many times as much chelating or sequestering agent as cation, since chelation is a stoichiometric reaction, and these amounts are not always desirable or economical. However, several decades ago, it was discovered that certain inorganic polyphosphates would prevent such precipitation when added in amounts far less than the concentrations needed for sequestering or chelating.

When a precipitation inhibitor is present in a potentially scale-forming system at a markedly lower concentration than that required for sequestering the scale-forming cation (stoichiometric), it is said to be present in "threshold" amounts. See, for example, Hatch and Rice, *Indust. Eng. Chem.*, 31, 51–53 (1939); Reitemeier and Buehrer, *J. Phys. Chem.*, 44 (5), 535–536 (1940); Fink and Richardson U.S. Pat. No. 2,358,222; and Hatch, U.S. Pat. No. 2,539,305.

Similarly, anionic and cationic polymers can be used as dispersants in accordance with methods known in the art, but the dosage levels necessary to achieve dispersion are in the range of 0.5–1.0% by weight of the system being treated, which is many orders of magnitude higher that the dosage levels used for the compositions of the present invention. Thus, it is a unique aspect of the present invention that it is possible to achieve essentially non-adherent scale using only threshold inhibitor dosage levels of the compositions of the present invention.

Recently, attention has been focused on controlling scaling under severe conditions, where conventional treatments such as those described above do not provide complete scale control. Current technology in scale control can be used to inhibit $CaCO_3$ scale up to 100 to 120 times calcite saturation, i.e., a water containing $Ca^{2+}$ and $CO_3^{2-}$ present at 100 times (100×) the solubility limit of calcium as calcite (calcite is the most common crystalline form of calcium carbonate). However, what is desired are inhibitors effective in greater than 150× water, especially in greater than 250× water, and more especially in greater than 300× water, i.e., where the calcite ions can be prevented from precipitating as calcium carbonate scale using substoichiometric amounts of an inhibitor. The compositions of the present invention are especially useful under severe conditions characterized by a calcite saturation level of 150× and above, especially 250× and above, and more especially 300× and above, as defined in the paragraph immediately below.

Severity of the scaling tendency of a water sample is measured using the saturation index, which may be derived in accordance with the following equation:

$$SI = \frac{[Ca^{2+}][CO_3^{2-}]}{K_{sp CaCO_3}}$$

where SI is the saturation index for calcium carbonate, $[Ca^{2+}]$ is the concentration of free calcium ions, $[CO_3^{2-}]$ is the concentration of free carbonate ions, and $K_{sp CaCO_3}$ is the conditional solubility product constant for $CaCO_3$. All of the quantities on the right side of the above equation are adjusted for pH, temperature and ionic strength.

Calculation and use of the saturation index, and generation of the data from which it is derived, are matters within the skill of the art. See, for example, *Critical Stability Constants*, Vol. 4; "Inorganic Complexes", Smith & Mantell (1976), Plenum Press; and *Aquatic Chemistry*, Chap. 5, 2nd ed., Stumm & Morgan (1981), Wiley & Sons.

Another characteristic feature of the severe conditions under which the scale controlling compositions of the present invention are especially useful is high pH, i.e. a pH of 8.5 and higher, particularly a pH of 9 or 10 or even higher. A related feature of such severe conditions is high alkalinity.

One of the particular advantages of the scale inhibiting compositions of the present invention is the exceptional calcium tolerances which they exhibit. Calcium tolerance is a measure of a chemical compound's ability to remain soluble in the presence of calcium ions ($Ca^{2+}$). One of the parameters of scale control under severe conditions is pH. As pH increases, calcium tolerance decreases rapidly for traditional $CaCO_3$ threshold inhibitors, e.g., 1-hydroxy ethylidene 1,1-diphosphonic acid (HEDP) and amino tri(methylene phosphonic acid) (AMP). These inhibitors precipitate with calcium at alkaline pH's, rendering them useless as threshold scale inhibitors. While it is common practice to use an acid feed to the water of, e.g., a cooling tower system in order to lower pH and thus avoid the calcium tolerance problem for conventional inhibitors, the danger to handlers which such acid feeding poses makes it all the more important to find scale inhibitors which operate at high pH's.

2. Brief Description of the Prior Art

Early efforts to reduce scale formation in water-carrying systems employed compounds such as tannins, modified lignins, algins, and other similar materials. Chelating or sequestering agents have also been employed to prevent precipitation or crystallization of scale-forming calcium carbonate. Another type of agent which has been actively explored heretofore as a calcium carbonate scale inhibiting material is the threshold active inhibitor. Such materials are effective as scale inhibitors in amounts considerably less than that stoichiometrically required, and this amount, as already mentioned, is termed the threshold amount. Inorganic polyphosphates have long been used as such threshold active inhibitors. For examples of such materials, see Fink—U.S. Pat. No. 2,358,222; Hatch—U.S. Pat. No. 2,539,305; and Ralston U.S. Pat. No. 3,434,969. Certain water soluble polymers, including groups derived from acrylamide and acrylic acid have been used to condition water containing scale-forming calciumcarbonate. For example, see U.S. Pat. Nos. 2,783,200; 3,514,476; 2,980,610; 3,285,886; 3,463,730; 3,518,204; 3,928,196; 3,965,027; and 4,936,987. In particular, there has been employed anionic polyelectrolytes such as polyacrylates, polymaleic anhydrides, copolymers of acrylates and sulfonates, and polymers of sulfonated styrenes. See, for example, U.S. Pat. Nos. 4,640,793; 4,650,591; 4,457,847; and 4,671,888. However, when used as threshold alkaline earth metal scale inhibitors, large dosages of these polymers are required, which in turn increases operating costs.

While various polycarboxylates, including polyacrylic acid, have been used as scale inhibiting agents, as described above, no similar use has been made of polycationic agents, apparently because of the difference in electronic charge and the conventional theories of the mechanisms of action for polymeric threshold inhibitors and dispersants.

While polyether polyamino methylene phosphonates of the type which comprise the active ingredient of the compositions of the present invention are known, their use for the control of alkaline earth metal scale, particularly calcium carbonate scale, under severe conditions which include elevated pH and high calcium carbonate saturation levels, has not heretofore been suggested.

For example, U.S. Pat No. 4,080,375 discloses methylene phosphonates of amino-terminated oxyalkylates for use as scale inhibitors, but these compositions are not the same as those of the present invention, nor is there any suggestion that such compositions would be useful under severe conditions as defined herein, where phosphonates such as HEDP and AMP give poor results. U.S. Pat. No. 4,931,189 discloses aminomethylene phosphonates of the type used in the method of the present invention, but for inhibiting oil field scale formation involving a high brine environment susceptible to gypsum or barite scale formation. Such use in no way suggests the control of scale under the severe conditions described herein under which the compositions and methods of the present invention operate with surprising success.

A particular phosphonate which has been marketed for scale control, but apparently not suggested for use under the severe conditions defined herein, is ethanolamine N,N-dimethylene phosphonic acid, sold under such trademarks as WAYPLEX 61-A and BRIQUEST 221-50A, and described in EP-A-0 384 779; U.S. Pat. Nos. 2,917,528; and 2,964,549.

SUMMARY OF THE INVENTION

The present invention relates to a composition useful as a deposit control agent to control the formation, deposition and adherency of scale imparting compounds in an aqueous system comprising a polyether polyamino phosphonate of the following formula:

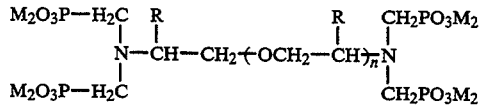

where n is an integer or fractional integer which is, or on average is, from about 2 to about 12, inclusive; M is hydrogen or a suitable cation; and each R may be the same or different and is independently selected from hydrogen and methyl. A preferred subclass of compositions of the above formula is that wherein M is hydrogen, R is methyl, and n is from about 2 to about 3, most preferably an average of about 2.6.

The present invention also relates to a composition useful as a deposit control agent to control the formation, deposition and adherence of scale imparting compounds in an aqueous system comprising, in combination, a polyether polyamino methylene phosphonate of the formula above, together with one or more members selected from the group consisting of homo- and copolymers including terpolymers comprising one or more of acrylamide, acrylic acid, 2-acrylamide-methyl propane sulfonic acid, methacrylic acid, itaconic acid, polyethylene glycol monomethacrylate, maleic anhydride, maleic acid, t-butyl acrylamide, sodium styrene sulfonate, sodium vinyl sulfonate, hydroxy propyl acrylate, hydroxy propyl methacrylate, 3-allyloxy-2-hydroxy propane sulfonic acid, sodium salt, and vinyl phosphonic acid, wherein the weight average molecular weight for such polymer additives is in the range of from about 500 to 250,000. In particular, the present invention relates to such compositions wherein said polymer additive is a member selected from the group consisting essentially of 90/10 to 10/90 AA/AMPSA, preferably 75/25 and 60/40 AA/AMPSA, 100 AA, 75/25 SSS/MA, 33/33/34 AA/MAA/IA, 50/50 AA/AM, 70/20/10 AA/AMPSA/PGM-5 (having 5 repeating oxyethylene units), and AA/AMPSA/TBAM.

The present invention further relates to a method of inhibiting the formation, deposition and adherence of scale-forming salts in an aqueous system, comprising the step of adding to said system an amount sufficient to establish a concentration of from 1 to 100 mg/L of a polyether polyamino methylenephosphonate of the formula above. In particular, the present invention relates to such a method in which calcium carbonate is the scale-forming salt and said phosphonate is added to the aqueous system being treated in an amount sufficient to establish a concentration of from 10 to 50 mg/L.

The present invention further relates to a method of inhibiting the formation, deposition and adherence of scale-forming salts in an aqueous system, comprising the step of adding to said system an amount sufficient to establish a concentration of from 1 to 100 mg/L of a composition comprising a polyether polyamino methylene phosphonate of the formula above, together with one or more members selected from the group consisting of: homo- and copolymers including terpolymers comprising one or more of acrylamide (AM), acrylic acid (AA), 2-acrylamide-methyl propane sulfonic acid (AMPSA), methacrylic acid (MAA), itaconic acid (IA), polyethylene glycol monomethacrylate (PGM), maleic anhydride (MAH), maleic acid (MA), t-butyl acrylamide (TBAM), sodium styrene sulfonate (SSS), sodium vinyl sulfonate, hydroxy propyl acrylate, hydroxy propyl methacrylate, 3-allyloxy-2-hydroxy propane sulfonic acid, sodium salt (AHPS), and vinyl phosphonic acid, wherein the weight average molecular weight for such polymer additives is in the range of from about 500 to 250,000. In particular, the present invention relates to such a method in which calcium carbonate is the scale-forming salt, the aqueous system comprises a cooling tower, said composition is added to the aqueous system being treated in an amount sufficient to establish a concentration of from 10 to 50 mg/L, and said polymer additive is a member selected from the group consisting essentially of 90/10 to 10/90 AA/AMPSA, preferably 75/25 and 60/40 AA/AMPSA, 100 AA, 75/25 SSS/MA, 33/33/34 AA/MAA/IA, 50/50 AA/AM, 70/20/10 AA/AMPSA/PGM-5 (having 5 repeating oxyethylene units), and AA/AMPSA/TBAM.

DESCRIPTION OF THE INVENTION

The composition of the present invention useful as a deposit control agent to control the formation, deposition and adherency of scale imparting compounds in an aqueous system comprises a polyether polyamino methylene phosphonate of the formula:

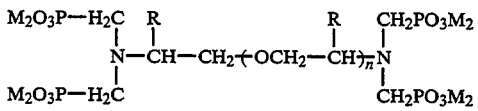

where n is an integer or fractional integer which is, or on average is, from about 2 to about 12, inclusive; M is hydrogen or a suitable cation; and each R may be the same or different and is independently selected from hydrogen and methyl.

A preferred subclass of compositions of the above formula is that wherein M is hydrogen, R is methyl, and n is from about 2 to about 3, most preferably an average of about 2.6.

In order to obtain high levels of control of scale deposits, especially under the severe conditions defined herein, it has been found that there are certain essential components of the structure of the polyether polyamino methylene phosphonates of the present invention which are necessary to provide that performance. Thus, e.g., the tetra(aminophosphonate) portion of the structure is essential. Whether these groups are present initially in the phosphonic acid form or as an alkali metal or other salt of the acid, has no real bearing on the performance of the overall molecule. At the pH's under which the compositions of the present invention function, they are, and must be, in their ionized form. Thus, it is not critical whether "M" is hydrogen or a suitable cation, and the selection of an appropriate salt form is well within the skill of the art. In addition to alkali metal salts, ammonium salts: $NH_4^+$, or ammonium derivative salts: $NR_4^+$ (R=alkyl etc.), or mixtures thereof, may be used. Alkali metal salts are the most simple, and are preferred for that reason.

A desirable, although not essential structural feature of the polyether polyamino methylene phosphonates useful in the compositions and methods of the present invention is the isopropyl group which bridges the diphosphonomethylamino group and the polyether group:

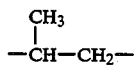

The isopropyl group has been found to provide enhanced scale inhibition activity under the severe conditions defined herein.

The next structural element of the polyether polyamino phosphonates to be considered is the polyether moiety:

R may be hydrogen or methyl, and thus the polyether moiety is either polyoxyethylene or polyoxypropylene, with the polyoxypropylene being preferred. Since the polyether polyamino methylene phosphonates are prepared by phosphonomethylation of the appropriate diamine, the character of the polyether moiety will depend upon the way in which the amine starting material is made. Processes for making such polyether diamines are known in the art; and attention is directed particularly to U.S. Pat. No. 3,236,895, which describes preparation of a variety of polyether diamines especially useful in preparing the phosphonate final products used as deposit control agents in the present invention.

In accordance with the processes set out in U.S. Pat. No. 3,236,895 and related processes described in the prior art, it is possible to prepare any one of a number of desired polyether diamines within the scope of the present invention. In the general formula for the polyether polyamino methylene phosphonates used herein, the polyether moiety is simply represented by the formula above. Since R may be hydrogen or methyl, both ethyleneoxy and propyleneoxy units are possible, as already mentioned. Moreover, R is to be independently chosen, i.e., ethyleneoxy and propyleneoxy units may alternate in various patterns, including blocks of each, or they may be all one or the other. For example, the following are just some of the polyether segments which might be prepared to form the basis for the corresponding diamines, which would then be used to make phosphonates within the scope of the present invention (where EO=ethyleneoxy, and PO=propyleneoxy):

EO; PO; EO-EO; PO-PO; EO-PO; EO-EO-EO; PO-PO-PO; EO-EO-PO; EO-PO-PO; EO-PO-EO; PO-EO-PO; EO-EO-EO-EO; PO-PO-PO-PO; EO-PO-PO-PO; EO-EO-PO-PO;EO-EO-EO-PO; EO-PO-EO-PO; EO-PO-PO-EO; PO-EO-EO-PO

In the above examples, "n" in the main formula would be an integer of from 1 to 4. Since "n" is defined as being from 1 to 12, an even larger number of possible polyether moieties is included. However, it has been found that generally the polyether polyamino methylene phosphonates of lower molecular weight, i.e., where "n" is a smaller integer, are those which provide the greatest amount of scale inhibition under the severe conditions of high pH and high calcite concentration, and thus are those which are preferred. Examples of some of these preferred phosphonates are shown in the table below, where Z=methylenephosphonate:

$$Z_2-N-\overset{R_z}{\underset{|}{C}}HCH_2-(O\overset{R_a}{\underset{|}{C}}H_2CH)_a-(O\overset{R_b}{\underset{|}{C}}H_2CH)_b-NZ_2$$

| Id. No. | a    | b | $R_z$  | $R_a$  | $R_b$  |
|---------|------|---|--------|--------|--------|
| A       | 2    | 1 | $CH_3$ | H      | $CH_3$ |
| B       | 2.6* | 0 | $CH_3$ | $CH_3$ | —      |
| C       | 2    | 0 | $CH_3$ | $CH_3$ | —      |
| D       | 8.5* | 1 | $CH_3$ | H      | $CH_3$ |
| E       | 5.6* | 0 | $CH_3$ | $CH_3$ | —      |
| F       | 2    | 0 | H      | H      | —      |
| G       | 3    | 0 | H      | H      | —      |
| H       | 3    | 0 | $CH_3$ | $CH_3$ | —      |
| I       | 3    | 1 | H      | $CH_3$ | H      |
| J       | 4    | 0 | H      | $CH_3$ | —      |

* = the value of "n" on average.

It will be noted from the table above that in several cases, "n" has an average value, i e , the number of repeating ethyleneoxy or propyleneoxy units may vary. Thus, it is possible to have a mixture of varying chain lengths of polyoxyethylene or polyoxypropylene in the final product. This is also contemplated to be within the scope of the present invention, so long as the requirements with respect to the limit of "n" are observed. Consequently, while "n" is merely defined as an integer or fractional integer which is, or on average is, from about 2 to about 12, it has two aspects. It defines the total of the number of repeating ethyleneoxy and/or propyleneoxy units considered separately, and thus if "n" is, e.g., 4, it includes 4 propyleneoxy units, 3 propyleneoxy units and 1 ethyleneoxy unit, 2 propyleneoxy units and 2 ethyleneoxy units, and so forth. The value of "n" may also represent an average number, and this is always the case, of course, when it is a fractional integer. In this case, for each of the ethyleneoxy and/or propyleneoxy units considered separately, mixtures of these units may be present so as to give an average value for "n". For example, in the table above, for Id. No. D, the total of "a" and "b" is 9.5, which is the value of "n". What is described is a mixture of polyether phosphonates in which all of them have an isopropyl bridging group and an ethyleneoxy moiety, but the repeating propyleneoxy units are such that on average their value is about 8.5.

The number of repeating ethyleneoxy or oxypropylene units, designated by the subscript "n", determines the total molecular weight of the overall polyether polyamino methylene phosphonate, and thus plays a critical role in determining the scale inhibiting performance of that phosphonate. It has been found that in order to provide adequate scale control under the severe conditions of use defined herein, it is necessary that "n" be an integer or fractional integer which is, or on average is, from about 2 to about 12, inclusive.

As discussed above, the reason for "n" being potentially a fractional integer arises from the fact that the primary diamine from which the polyether polyamino methylene phosphonates are prepared by phosphonomethylation may be a mixture of polyethers in which "n" is two or more of 2, 3, 4, 5 and so forth, in varying proportions. For example, a preferred polyether polyamino methylene phosphonate for use in the compositions and methods of the present invention has a molecular weight of approximately 632 and the value of "n" on average is about 2.6. Thus, this type of polyether phosphonate has a molecular weight distribution, i.e., of the various polyoxypropylenes which make it up, and this distribution is represented by a fractional integer average value for "n". But, it is also within the scope of the present invention for "n" to be a whole integer, e g "3", which usually designates a single molecular weight and not a molecular weight distribution.

The polyether polyamino methylene phosphonates of the compositions and methods of the present invention are prepared first by phosphonomethylation of the appropriate primary diamine which already contains the polyoxyethylene and polyoxypropylene moieties.

Such primary amine starting materials and their method of preparation are well known. The phosphonomethylation of the primary diamine is then carried out by a Mannich reaction such as that described in K. Moedritzer and R. Irani, *J. Organic Chem.* 31(5) 1603–7, "The Direct Synthesis of alpha-Aminomethyl Phosphonic Acids; Mannich-Type Reactions with Orthophosphorous Acid", May 1966. In a typical reaction, the primary diamine is added to a mixture of phosphorous acid and water, and concentrated hydrochloric acid is then added slowly, after which the reaction mixture is heated to reflux with addition of aqueous formaldehyde.

Although the general structural formula employed herein indicates that the nitrogen atom is completely phosphonomethylated, as a practical matter, preparation of the polyether polyamino methylene phosphonates of the present invention, as described in detail further below, usually results in only about 80 to 90% phosphonomethylation. Other side products give N-substitution with H, $CH_3$, $CH_2OH$, etc. It is not practical, as a matter of simple production economics, however, to isolate and purify the completely phosphonomethylated compounds, since the side products just described do not interfere with scale deposit inhibition. Such side products, are consequently, usually allowed to remain, and the test data set out further below is based on test samples containing such side products. Consequently, the activity levels obtained would be even higher were 100% active compound being tested.

When any of the polyether polyamino methylene phosphonate compositions of the present invention are used to inhibit the precipitation, deposition, and adherence of scale-forming salts in an aqueous system, they can be effectively employed for that purpose when added in amounts sufficient to establish a concentration in said aqueous system of from 1 to 100 mg/L. Preferably, the amount added will be sufficient to establish a concentration of from 5 to 75 mg/L, and most preferably, the amount added will be sufficient to establish a concentration of from 10 to 50 mg/L of the composition. It is understood, however, that many factors, of the type which have been explained in detail with regard to the background to the present invention, will determine the actual amount of the polyether polyamino methylene phosphonate compositions of the present invention which will be added to any particular aqueous system in order to achieve the maximum amount of inhibition of alkaline earth metal, especially calcium carbonate scale formation, deposition and adherence in that aqueous system. The calculation of those amounts is well within the skill of the artisan in this field.

When the polyether polyamino methylene phosphonate compositions of the present invention are used in combination with one or more of the polymers recited further above, the amounts of that combination which must be added in order to inhibit the formation, deposition and adherence of scale-forming salts in an aqueous system, will as a general matter be within the ranges of amounts sufficient to establish the ranges of concentrations of the polyether polyamino methylene phosphonates used alone, as recited in detail above. Again, however, calculation of the actual amount is well within the skill of the art.

The phrases "inhibiting the precipitation" and "inhibiting the formation and deposition" are meant to include threshold inhibition, dispersion, solubilization, or particle size reduction. The phrases "inhibiting the adherence" and "increasing the non-adherence", are meant to define the formation of a scale deposit which is easily removed, e.g., by simple rinsing, i.e., a scale deposit which is not so firmly bonded to the surface to which it is attached that it cannot be removed by simple physical means as opposed to harsh mechanical or chemical treatment.

The phrase "scale-forming salts" is meant to include any of the scale-forming salts, including, but not limited to, calcium carbonate, calcium sulfate, calcium phosphate, calcium phosphonate (including calcium hydroxyethylidene diphosphonic acid), calcium oxalate, calcium fluoride, barium sulfate and magnesium salts.

The phrase "aqueous system" means commercial or industrial systems utilizing water and involving heat exchange surfaces, usually of metal, including cooling water systems, especially cooling towers, boiler water systems, desalination systems, gas scrubbers, and thermal conditioning equipment. Of particular importance are those systems which operate under severe conditions as detailed herein, including high pH and high calcite concentrations. Typical of such systems are cycled up cooling towers, reverse osmosis systems, sugar refining evaporators, and certain types of gas scrubbers.

The manner of addition of any particular polyether polyamino methylene phosphonate composition of the present invention, to an aqueous system will also be straightforward to a person of ordinary skill in this art. It may be added in liquid form by mechanical dispensers of known design. It may also be added in diluted liquid form. The polyetherpolyamino methylene phosphonate composition may also be combined with other chemical treatment agents for dispensing to the aqueous system; and these in combination may be dispensed in liquid form.

In the embodiments of the present invention described above, it has been contemplated that only a single polyether polyamino methylene phosphonate composition of those described above would be used for the purpose of inhibiting scale. However, it is also contemplated that one of these compositions could be combined with one or more polyelectrolytes so as to provide an even more effective product for the inhibition of scale under the severe conditions described herein.

For example, there could be used in such a combination one or more members selected from the group consisting of homopolymers, copolymers and terpolymers comprising one or more monomers of acrylamide (AM), acrylic acid (AA), 2-acrylamide-methyl propane sulfonic acid (AMPSA), methacrylic acid (MAA), ethoxylated methacrylate, itaconic acid (IA), polyethylene glycol monomethacrylate (PGM), maleic anhydride (MAH), maleic acid (MA), t-butyl acrylamide (TBAM), sodium styrene sulfonate (SSS), sodium vinyl sulfonate, hydroxy propyl acrylate, hydroxy propyl methacrylate, 3-allyloxy-2-hydroxy propane sulfonic acid (AHPS), and vinyl phosphonic acid. Weight average molecular weights for such polymer additives should range from about 500 to 250,000.

For example, such compositions include copolymers of 90/10 to 10/90 AA/AMPSA, preferably 75/25 and 60/40 AA/AMPSA. Other preferred polymer additives for use with the polyether polyamino methylenephosphonates of the present invention include 100 AA, 75/25 SSS/MA, 33/33/34 AA/MAA/IA, 50/50 AA/AM, 70/20/10 AA/AMPSA/PGM-5 (having 5 repeating oxyethylene units), and AA/AMPSA/TBAM.

Combinations using these polymers together with the polyether polyamino methylene phosphonate compositions of the present invention can increase the amount of scale control and deposit control which is achieved under the severe conditions described herein.

In addition to the polymer additives described above, the polyether polyamino methylene phosphonate compositions of the present invention can be used in further combination with yet other additives which increase their effectiveness. Thus, it is possible, and often desirable to use one or more steel and/or copper corrosion inhibitors along with the polyether polyamino methylene phosphonate scale inhibitor in order to obtain corrosion rates which are acceptable. Acceptable corrosion rates depend on the circumstances surrounding each particular use environment, but will usually depend to a large degree on expectations with regard to the life expectancy of the equipment present in said environment. Also, acceptable corrosion almost always implies an absence of pitting attack type corrosion. The nature of the equipment involved will depend on the application area, but usually the metals from which such equipment is constructed and which are subject to corrosive attack, are primarily steel in its various common forms, including stainless steel, and copper itself or various alloys thereof, particularly brass. All of these metals are subject to corrosive attack, which, under the severe conditions of use of the compositions and methods of the present invention, may be even greater than the extent of corrosive attack which is experienced under more normal conditions; and, therefore, all of these metals will benefit from the use of one or more corrosion inhibitors in conjunction with the polyether polyamino methylene phosphonate scale inhibitors of the present invention.

With regard to corrosion inhibitors for steel and its alloys, it has been found that, surprisingly, not all corrosion inhibitors, including those which perform well with known phosphonate scale inhibitors used in the prior art, and might, therefore, be expected to provide adequate protection, are suitable for use with the polyether polyamino methylene phosphonate scale inhibitors of the present invention. This is yet another instance in which the polyether phosphonates of the present invention are characteristically unique. For example, it has been found that the molybdate and nitrite classes of corrosion inhibitors, which usually provide good corrosion protection, especially against pitting attack type corrosion, are not suitable for use with the polyether phosphonate scale inhibitors of the present invention.

On the other hand, there are numerous steel corrosion inhibitors which are suitable, and such suitability can be readily determined in accordance with the simple test procedures detailed in the description of preferred embodiments which follows. Thus, it is within the ordinary skill of the artisan to determine which steel corrosion inhibitors would be suitable, and all such inhibitors are contemplated to be a part of the present invention. Having carried out the test procedures referred to above, it has been determined that the following steel corrosion inhibitors provide adequate levels of corrosion protection, including protection against pitting attack type corrosion, when used in combination with the polyether phosphonate scale inhibitors of the present invention:

hexametaphosphate,
orthophosphate,
pyrophosphate,
hydroxyphosphonoacetic acid (HPA),
2-phosphonobutane-1,2,4-tricarboxylic acid (PBTC),
manganese [$Mn(II)^{+2}$], and
zinc [$Zn(II)^{+2}$].
Of the above steel corrosion inhibitors, the most preferred are hydroxyphosphonoacetic acid (HPA), orthophosphate+HPA, and HPA+PBTC.

The concentration of the steel corrosion inhibitor(s) which is required to provide adequate protection against corrosion will depend upon the makeup of the water in the aqueous system being treated, the pH, and the temperature. Generally, however, the desired concentration of the preferred inhibitors recited above will be in the range of from about 0.1 mg/L to about 100 mg/L, preferably from about 1 mg/L to about 25 mg/L, and most preferably from about 1 mg/L to about 10 mg/L.

With regard to corrosion inhibitors for copper and its alloys, again it is possible to determine which copper corrosion inhibitors are suitable by utilizing the simple test procedures described in detail in the preferred embodiments further below. Using such procedures, it has been determined that the following are suitable copper corrosion inhibitors for use with the polyether polyamino methylene phosphonate scale inhibitors of the present invention:

benzotriazole,
tolyltriazole,
2-mercaptobenzothiazole,
combinations of tolyltriazole and mercaptobenzothiazole as described in U.S. Pat. No. 4,675,158,
higher alkylbenzotriazoles of the type described in EP-A-0 397 454, and combinations thereof as described in EP-A-0 462 809,
alkoxybenzotriazoles and combinations thereof as described in EP-A-0 478 247, and
phenyl mercaptotetrazole and combinations thereof as described in EP-A-0 462 666.

The concentration of the desired copper corrosion inhibitor which should be used will depend not only on the inhibitor itself, but on such other factors as the yellow metal surface area and total aqueous system volume, the concentration of dissolved and suspended copper, the pH, dissolved solids, and temperature as well. Generally, however, suitable copper corrosion inhibitors will be added in a range of concentrations from about 0.1 to about 100 mg/L, preferably from about 0.5 to about 20 mg/L, and most preferably from about 1 to about 5 mg/L.

EXAMPLES OF PREFERRED EMBODIMENTS

The following examples are presented for the purpose of illustrating the present invention, but are not intended to be in any way a limitation thereof.

EXAMPLE 1

CaCO$_3$ Scale Inhibition at pH 9 and 300× Calcite Saturation—Polyether Polyamino Phosphonates Alone In order to demonstrate the improved scale inhibition performance of the polyether polyamino methylene phosphonates used in the method of the present invention, the following procedure was used:

PROCEDURE:

Scaling water containing 250 mg/L of Ca$^{+2}$ and 600 mg/L of alkalinity at a pH of 9.0 and 55° C. was used to evaluate scale inhibition performance of test solutions over a 24 hour period. Test solutions were analyzed by withdrawing 10 g of test solution and adding it to the appropriate container through a 0.2 m filter and titrating for calcium and calculating % inhibition by the Schwarzenbach method.

The polyether polyamino methylene phosphonates used as the test sample were the compositions of the secondary formula set out further above on page 17 hereof, identified as Id No "A" through "J", including particularly Id. No. "B", which is the phosphonate of the main formula wherein both R's are methyl, M is hydrogen, n is 2.6 on average, and the resultant molecular weight is, on average, about 600. The results obtained are shown in the table of values below.

TABLE 1

| SAMPLE NO. | % CaCO$_3$ SCALE INHIBITION | | | | |
|---|---|---|---|---|---|
| | 20 ppm | 25 ppm | 30 ppm | 40 ppm | 50 ppm |
| A | 94 | — | 100 | — | 99 |
| B | 97 | 92 | 95 | 96 | 94 |
| C | 73 | — | 97 | — | 99 |
| D | — | 85 | — | — | 84 |
| E | — | 89 | — | — | 91 |
| F | — | 85 | — | — | 84 |
| G | 79 | — | 83 | — | 83 |
| AMP | — | — | — | — | 52 |

EXAMPLE 2

CaCO$_3$ Scale Inhibition at pH 9 and 300× Calcite Saturation—Polyether Polyamino Methylene Phosphonates In Combination with Polyelectrolytes Following the test procedures described in Example 1 above, the polyether polyamino methylene phosphonate of the present invention having a molecular weight of about 600 (n=2.6) was evaluated in combination with several polyelectrolytes. In addition, in order to evaluate the scale inhibiting activity of the combinations over a period of time, the % inhibition was calculated at 4 days, as well as at 24 hours. The results of those evaluations are set out in the table of values below.

TABLE 2

% CaCO$_3$ Scale Inhibition with Polyether Polyamino Phosphonate of Molecular Weight about 600 (n = 2.6) in Combination with Various Polyelectrolytes

| SAMPLE NO. | POLYELECTROLYTE | DOSAGE (ppm) | RATIOS OF POLYELECTROLYTE:PHOSPHONATE | | | | | |
|---|---|---|---|---|---|---|---|---|
| | | | 1.5:1 | 1:1 | 1:1.5 | 1:2 | 1:3 | 1:4 |
| 3 | 60/40 AA/AMPSA 24 Hour | 20 | 44.0 | — | 60.0 | — | 73.0 | 84.5 |
| | | 30 | 47.0 | — | 77.0 | 84.5 | 88.0 | — |
| | | 40 | 49.0 | 83.1 | 95.0 | 97.2 | 93.2 | — |
| | | 50 | 53.0 | 94.4 | 96.8 | — | 98.0 | — |
| 4 | 75/25 AA/AMPSA | 50 | | | | | | |
| | 24-Hour | | — | — | 95.7 | — | — | 97.1 |
| | 4-Day | | — | — | 78.3 | — | — | 91.3 |
| 5 | 50/50 SSS/MA (Versa TL-7) | 50 | | | | | | |
| | 24-Hour | | — | 94.1 | 95.6 | — | — | 92.6 |
| | 4-Day | | — | 70.6 | 94.1 | — | — | 88.2 |
| 6 | 75/25 AA/AHPS (Aquatreat CPA-III) | 50 | | | | | | |
| | 24-Hour | | — | 82.3 | 82.3 | — | — | 89.7 |
| | 4-Day | | — | 55.9 | 82.3 | — | — | 91.1 |
| 7 | 75/25 SSS/MA (Versa TL-4) | | | | | | | |

TABLE 2-continued

% CaCO₃ Scale Inhibition with Polyether Polyamino Phosphonate of Molecular Weight about 600 (n = 2.6) in Combination with Various Polyelectrolytes

| SAMPLE NO. | POLYELECTROLYTE | DOSAGE (ppm) | \multicolumn{6}{c}{RATIOS OF POLYELECTROLYTE:PHOSPHONATE} |
|---|---|---|---|---|---|---|---|---|

| SAMPLE NO. | POLYELECTROLYTE | DOSAGE (ppm) | 1.5:1 | 1:1 | 1:1.5 | 1:2 | 1:3 | 1:4 |
|---|---|---|---|---|---|---|---|---|
| | 24-Hour | | — | 88.4 | 88.4 | — | — | 92.8 |
| | 4-Day | | — | — | — | — | — | 86.9 |
| 8 | 100 AA | 50 | | | | | | |
| | 24-Hour | | — | — | — | — | — | 92.8 |
| | 4-Day | | — | — | — | — | — | 79.7 |
| 9 | 33/33/34 AA/MAA/IA | 50 | | | | | | |
| | 24-Hour | | — | — | — | — | — | 88.4 |
| | 4-Day | | — | — | — | — | — | 59.4 |
| 10 | AA/AM (C-20) | 50 | | | | | | |
| | 24-Hour | | — | — | — | 85.5 | 91.3 | — |
| | 4-Day | | — | — | — | 78.3 | 72.5 | — |
| 11 | 70/20/10 AA/AMPSA/PGM-5 | 20 | — | — | 77.0 | — | 72.0 | — |
| | 24-Hour | 30 | — | — | 88.0 | — | 85.0 | — |
| | | 40 | — | — | 88.0 | — | 96.0 | — |
| | | 50 | — | — | 91.0 | — | 96.0 | — |

VERSA TL-4 and TL-7, and AQUATREAT CPA-III are registered trademarks of National Starch & Chemical Corp., Bridgewater, NJ.

EXAMPLE 3

CaCO₃ Scale Adherence

The polyether polyamino methylene phosphonate of the present invention having a molecular weight of about 600 (n=2.6), as well as combinations with various polyelectrolytes, were tested for their ability to control scale adherence on heat transfer surfaces.

Equipment

Apparatus loop includes a hot bath, a cold bath and 3 cells. Each cell consists of a jacketed beaker equipped with heat transfer "U" tube (Admiralty Brass), pH controller, level controller, thermometer, air vents and make-up tank. The total volume was 950 ml.

Procedures

1. Tubes precleaned with 50:50 HCl:H₂O, rinsed with deionized H₂O, and scoured with a nylon pad.
2. Water baths for the jacketed beaker and U tube are set to maintain temperature of bulk water at 50°–55° C.
3. Position "U" tubes in lids so that the same amount of tubing is exposed in each cell.
4. Add enough preheated H₂O to cover pH electrode bulb; add desired amount of inhibitor solution; add 120 mg/L of $Ca^{++}$. Adjust pH to 7.5±0.1 using 1.0 N NaOH.
5. Mix volume alkalinity solution to give 180 mg/L $HCO_3$ with the remaining preheated H₂O and immediately add to the cell. pH should rise to 9.0±0.1.
6. Air flow is adjusted to give an evaporation rate of 2/3 L/day.
7. Makeup tank contains stable solution of 60 mg/L $Ca^{++}$ and 90 mg/L $HCO_3$ which is added on demand as the water in the jacketed beaker evaporates. This concentrates and supersaturates the $Ca^{++}:CO_3^{=}$. The test is run for five to six days to concentrate the solution until 325 mg/L $Ca^{++}$ and 486 mg/l $HCO_3^-$ are present, pH 9, 55° C. to give approximately 300 times CaCO₃ saturation.
8. Once the appropriate supersaturation is attained, the makeup tank is switched to deionized water and the tests are continued for 24 hours. Total test time is 6 days.

Deposit Analyses:

Rinse any deposit or coating from tube with 1:3 HCl:H₂O into beaker, and wash tube well with distilled H₂O into same beaker. Neutralize washing to pH 4–7 with conc. NaOH solution. Transfer to 250 ml volumetric; dilute to mark. Analyze 25 ml aliquots for Ca by titrating with 0.01M EDTA solution. Report as mg Ca tube deposit.

Using the procedure described above, the deposit weights obtained were as illustrated in Table 3 below.

TABLE 3

CaCO₃ Scale Adherence with Polyether Polyamino Phosphonate of Molecular Weight about 600 (n = 2.6) in Combination with Various Polyelectrolytes at a Dose of 25 mg/L Active

| TREATMENT | RATIO | TUBE DEPOSIT Ca (mg) | Phosphonate (mg) |
|---|---|---|---|
| Control | | 65.0 | |
| Exp. 1 alone | | 3.89 | |
| Exp. 1 + 60/40 AA/AMPSA | 3:1 | 0.64 | 0.39 |
| | 4:1 | 0.56 | 0.35 |
| Exp. 1 + 50/50 SSS/MA (Versa TL-7) | 1.5:1 | 0.70 | 0.40 |
| | 4:1 | 1.3 | 0.68 |
| Exp. 1 + 70/20/10 AA/AMPSA/PGM-5 | 4:1 | 0.96 | 0.50 |

The above test results indicate great improvement over the blank and substantial improvement in activity compared to the polyether polyamino methylene phosphonate used alone.

EXAMPLE 4

Pilot Cooling Tower

Further testing of the ability of the polyether polyamino methylene phosphonate compositions of the present invention to prevent deposits was performed in a pilot cooling tower. This pilot cooling system contains two separate test systems: identified as Side A and Side B. Each side consists of a recirculating cooling tower with four single tube heat exchangers connected in series. The heat exchangers comprise ⅜" stainless steel and ½" admiralty brass tubes. The flow rate through the system was 3.0 gpm producing linear velocities of 2.9 and 7.5 ft/sec through the tube heat exchangers. The inlet temperature to the first tube heat exchanger was 110° F. and the outlet temperature at the fourth tube heat exchanger was 133° F., for a WT of 23° F. at 10,000

BTU/hr-ft$^2$. Treatments used were 25 mg/L active: polyether polyamino methylene phosphonate of molecular weight about 600 (Example 1) in Side A; 25 mg/L active: a commercial product consisting of 1:2 of HEDP/AMP combined at 1.5:1 with 60/40 AA-/AMPSA in Side B. The same makeup water as used in Example 3 was used in the test. The systems were cycled up to 5.4 cycles of concentration giving a target of 300× (times) calcite saturation. The systems were held at the target cycles by controlling the conductivity of the water for 24 days. The pH was not controlled by acid, but allowed to establish its own equilibrium. After 24 days the heat transfer tubes were pulled and deposit weights for the two treatments determined. Results were as follows:

TABLE 4

| Total Deposit Weights from 12" Cross-Sections | | |
|---|---|---|
| Treatment A | Exp. 1 | 0.0973 g |
| Treatment B | HEDP/AMP/AA/AMPSA | 5.55 g |

The scale inhibitor of the present invention reduced the deposit compared to conventional treatment by a factor of 570.

EXAMPLE 5

Preparation of N,N,N',N'-Tetramethylene Phosphono Polyoxypropylene Diamine

A diamine having an average molecular weight of about 230 and having the structural formula: H$_2$NCH(CH$_3$)—CH$_2$—[—OCH$_2$CH(CH$_3$)—]$_{2.6}$—NH$_2$ (56.2 g) was added to a mixture of phosphorous acid (82 g) and deionized water (65 g) in a one liter resin flask fitted with a condenser, a Teflon stirrer, a thermometer and an addition funnel. It is important to maintain as low a level of iron (Fe) in the reaction mixture as possible, and the most likely source of Fe is the phosphorous acid. The Fe interferes somewhat with the reaction, and consequently a low Fe content phosphorous acid is employed.

There was then added slowly to the reaction mixture 50 mL of concentrated HCl. The reaction mixture was subsequently heated to reflux (107° C.). The temperature should be at least 95° C., but the best results are obtained when the reaction mixture is heated to reflux. After the reaction mixture reached reflux, there was added 150 g of 37% aqueous HCHO, which was added dropwise over a period of about 45 min. In order to obtain the best results, the ratio of HCHO to diamine starting material should be at least 4:1 on a molar basis, and preferably somewhat higher, as was the case in this synthesis.

The reaction mixture was then refluxed for an additional period of 3 hrs. While the reaction time depends upon temperature, best results are obtained by refluxing for at least ½ hr, preferably 2 to 3 hrs.

The reaction mixture was then cooled, and 97.2 g of volatiles were stripped off at 50° C. using a rotary evaporator. A total of 303.4 g of product was obtained, with a theoretical activity of 48%. P$_{31}$ NMR indicated that at least about 85% of the —NH groups has been phosphonomethylated. Impurities included unreacted phosphorous acid, formaldehyde, phosphoric acid, methanolphosphonic acid, and other unidentified phosphorous compounds.

It has been found that the scale control performance of the polyether polyamino methylene phosphonates of the present invention depends to some extent, although not a very significant extent, on the variations in the process parameters described above. Best results are obtained, consequently, by employing the optimum conditions as outlined above.

EXAMPLE. 6

Combinations with Steel Corrosion Inhibitors

Corrosion test procedures were carried out in an 8 L vessel fitted with a heater having a temperature controller, a pump to circulate the water in the test apparatus, a pH monitor and controller to maintain the desired pH, and an aerator to both ensure air saturation, and to introduce carbon dioxide gas as required for pH control. The steel coupon specimens for the test were composed of 1010 carbon steel (UNS designation G10100), and these were immersed in the water of the test apparatus. Corrosion penetration rates in mils per year (mpy) were determined gravimetrically after 7 days by the standard ASTM-G1-88 method. The composition of the water used in the test apparatus was as follows:

| Ion | Conc. (mg/L) |
|---|---|
| Ca | 208 |
| Mg | 128 |
| Cl | 416 |
| SO$_4$ | 1025 |
| SiO$_2$ | 14 |
| Alkalinity as CaCO$_3$ | 498 |
| Polymer dispersant | 5 |

[The polymeric dispersant is a random copolymer of approximately 70% acrylic acid, 30% acrylamido-(2-methylpropane-1-sulfonic acid), and 10% acrylic acid ester of 1-hydroxy-penta-ethyleneoxide.] The water described above was maintained at a pH of 8.5 and the polyether phosphonate scale inhibitor was the composition used in Example 1 above, which was tested alone, as well as in combination with various steel corrosion inhibitors. The results obtained are shown in the following table of values.

TABLE 5

| | | | SPECIMEN APPEARANCE | |
|---|---|---|---|---|
| TREATMENT | CONC. (mg/L) | CORROSION RATE (mpy) | Before Removing Corr. Products | After Removing Corr. Products |
| Exp. 1 | 20.4 | 4.0 | Dense black spots | pitting |
| Exp. 1 + Zn | 20.4 3 | 3.0 | Dense black spots | pitting |
| Exp. 1 + molybdate | 20.4 15 | 6.4 | Dense black nodules | pitting |
| Exp. 1 + nitrite + PBTC | 20.4 100 10 | 3.7 | Dense black nodules | pitting |
| Exp. 1 + HPA | 20.4 10 | 0.9 | only slight fine brown spots | no pitting |

What is claimed is:

1. An aqueous system containing scale-forming salts and characterized by high pH and high calcite concentrations wherein the pH is at least 8.5 and the calcite saturation level is at least 150 times the solubility limit of calcium as calcite, which further contains, in an amount sufficient to establish a concentration of from 10 to 50 mg/L, a polyether polyamino methylene phosphonate of the formula:

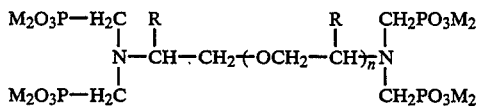

where n is an integer or fractional integer which is, or on average is, from about 2 to about 12, inclusive; M is hydrogen or a cation of an alkali metal salt; and each R may be the same or different and is independently selected from hydrogen and methyl.

2. An aqueous system according to claim 1 wherein for the polyether phosphonate, M is hydrogen, each R is methyl, and n is from about 2 to about 4.

3. An aqueous system according to claim 2 wherein n is about 2.6.

4. An aqueous system according to Claim 3 wherein the aqueous system is a cycled up cooling tower.

5. An aqueous system containing scale-forming salts and characterized by high pH and high calcite concentrations wherein the pH is at least 8.5 and the calcite saturation level is at least 150 times the solubility limit of calcium as calcite, which further contains, in an amount sufficient to establish a concentration of from 10 to 50 mg/L, a polyether polyamino methylene phosphonate of the formula:

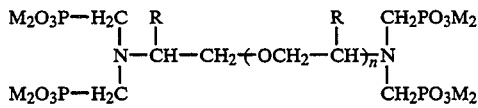

where n is an integer or fractional integer which is, or on average is, from about 2 to about 12, inclusive; M is hydrogen or a cation of an alkali metal salt; and each R may be the same or different and is independently selected from hydrogen and methyl;

TOGETHER WITH one or more homopolymers, copolymers and terpolymers comprising one or more of acrylamide (AM), acrylic acid (AA), 2-acrylamide-methyl propane sulfonic acid (AMPSA), methacrylic acid (MAA), ethoxylated methacrylate, itaconic acid (IA), polyethylene glycol monomethacrylate (PGM), maleic anhydride (MAH), maleic acid (MA), t-butyl acrylamide, sodium styrene sulfonate (SSS), sodium vinyl sulfonate, hydroxy propyl acrylate, hydroxy propyl methacrylate, 3-allyloxy-2-hydroxy propane sulfonic acid (AHPS), and vinyl phosphonic acid, wherein the weight average molecular weight for such polymer additives is in the range of from about 500 to 250,000.

6. An aqueous system according to claim 5 wherein for the N-oxide, M is hydrogen, each R is methyl, and n is about 2.6.

7. An aqueous system according to claim 6 wherein the polymer additive is polyacrylic acid and copolymers of AA/AMPSA, SSS/MA, AA/MAA/IA, AA/AM, AA/AMPSA/PGM-5 (having 5 repeating oxyethylene units), and AA/AMPSA/TBAM.

8. An aqueous system according to claim 7 wherein the aqueous system is a cycled up cooling tower.

* * * * *